United States Patent [19]
Gryncewicz

[11] 3,851,784
[45] Dec. 3, 1974

[54] SEAL STRUCTURE

[76] Inventor: Bronislaus Gryncewicz, c/o Polytop Corporation, Slatersville, R.I. 02876

[22] Filed: Apr. 24, 1972

[21] Appl. No.: 246,775

[52] U.S. Cl............................. 215/40, 215/DIG. 1
[51] Int. Cl............................................. B65d 41/04
[58] Field of Search................ 215/DIG. 1, 40, 43 R

[56] References Cited
UNITED STATES PATENTS

| | | | |
|---|---|---|---|
| 1,858,356 | 5/1932 | Brown............................ | 215/DIG. 1 |
| 2,715,480 | 8/1955 | Livingstone..................... | 215/DIG. 1 |
| 3,107,022 | 10/1963 | Wandell............................ | 215/43 R |
| 3,339,773 | 9/1967 | Stull..................................... | 215/40 |
| 3,568,871 | 3/1971 | Livingstone............................ | 215/40 |

*Primary Examiner*—Donald F. Norton
*Attorney, Agent, or Firm*—Edward D. O'Brian

[57] ABSTRACT

An advantageous seal structure may be integrally molded with a polyethylene or similar closure having a closure top and a peripheral skirt so as to depend from the top within the skirt adjacent to the skirt. The seal structure preferably comprises an annular sealing flange having a top, a V-shaped pointed bottom and concentric sides, one of which sides is attached at its upper end to the closure top so as to cause the sealing flange to flex inwardly as it is applied to the end of a container neck.

1 Claim, 2 Drawing Figures

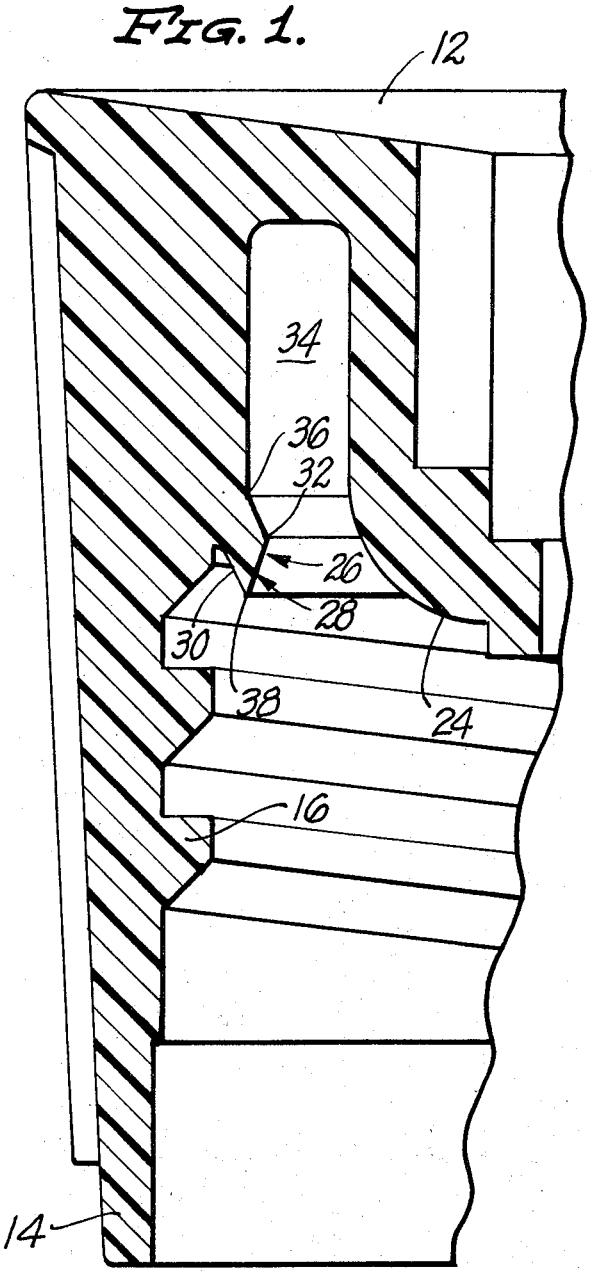
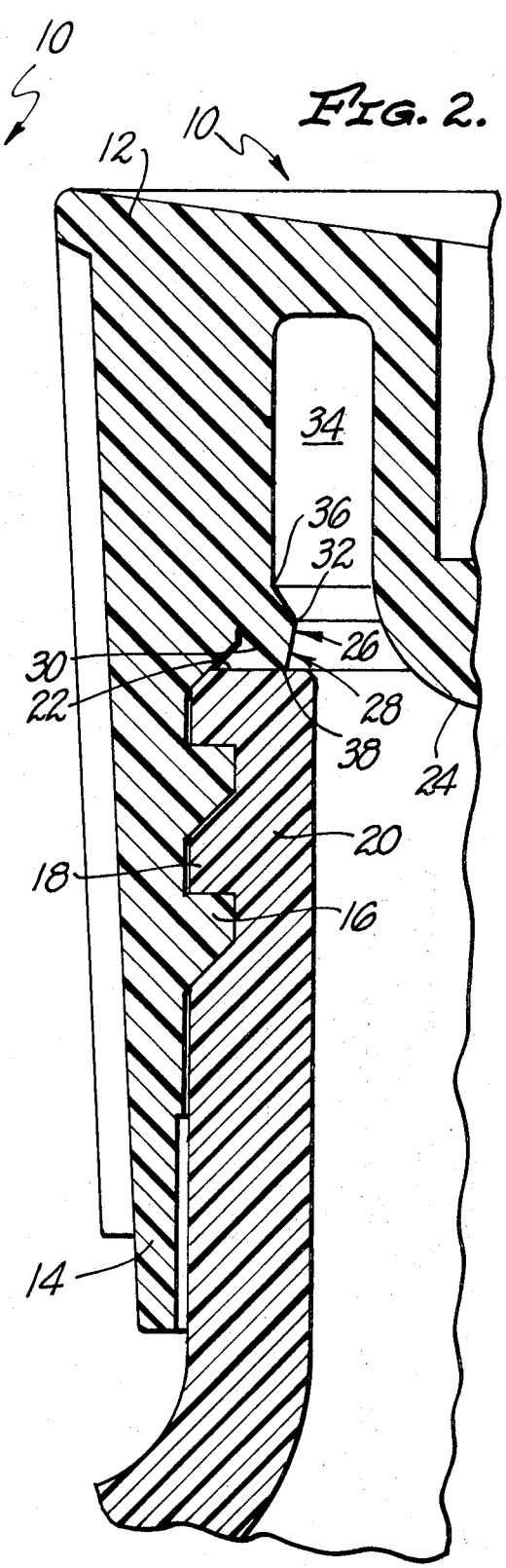

SEAL STRUCTURE

BACKGROUND OF THE INVENTION

It is a matter of common knowledge that an adequate, satisfactory seal structure must be utilized with a closure such as a common bottle cap in order that the closure will adequately seal within a container various fluids as a consequence of the seal structure engaging a container neck. For many years the most common of such seal structures consisted of separate members such as a cork washer or a rubber washer held by a closure. Economic considerations have tended to make such separate seal members relatively undesirable.

As more and more closures have been developed and manufactured out of materials such as polyethylene it has been realized that it is possible to mold integrally with such closures various seal structures which will engage a container neck so as to form a seal therewith. This concept of integrally molding a seal structure with a closure is considered to be quite advantageous from an economic standpoint. Unfortunately, however, many of the seal structures which have been utilized with these molded closures have not always operated satisfactorily. The reasons for this are many and varied.

Many of such reasons pertain to the nature of the containers and container necks upon which these molded closures are used. For reasons which are unimportant to this invention blow-molded and other polyethylene and similar bottles upon many of these molded closures are employed tend to differ significantly from one another. Not infrequently, the top surfaces of the necks on such bottles have a slight amount of surface irregularity or roughness. Many of these molded bottles as provided by a manufacturer have necks which extend in planes which are not completely perpendicular to the axes of these necks. Further, the thickness of the material in container necks will tend to differ.

All of these factors tend to make it difficult to provide adequate, molded in place seal structures within polyethylene and similar molded container closures. The generalized problem of providing adequate seal structures in these closures is further complicated by a number of other factors. It is well-established that even small variances in the physical properties of polymer materials used in injection molding will make small differences in part dimensions which in certain circumstances can be extremely critical. Variations in injection molding cycles, temperatures and the like will also cause significant differences affecting whether or not injection molded parts such as seal structures have a desired, final shape.

In effect to be satisfactory a molded in place seal structure must be formed or shaped in such a manner that it will operate satisfactorily almost in spite of all of the various different considerations indicated in the preceding discussion. From a purely practical consideration a satisfactory seal structure to be molded integrally with a closure must be of such a shape that it can be easily and conveniently formed without significant problems related to the shape of the die or mold used in forming it. Further, such a seal structure should be capable of being produced from a die having a shape enabling it, the die, to be easily operated with a minimum of difficulty.

Various different seal structures as have been used in the past as integral parts of closures have unquestionably been utilitarian to a significant degree. This does not, however, mean that there is no need for improvement in this field of integrally formed or molded in place closure seal structures. In connection with this it should be borne in mind that a manufacturer can be severely damaged if even a small fraction of a percent of products packaged leak out of their containers due to failure of the seal structures within the closures used with such containers.

BRIEF SUMMARY OF THE INVENTION

From a consideration of the preceding it is believed that it will be apparent that there is a continuing need for new and improved seal structures which are more reliable than prior related structures as are currently being utilized. A broad objective of the present invention is to provide integrally molded seal structures which it is believed will fulfill this need for improvement in the field of closures having integrally molded seals.

Another objective of the present invention is to provide seals or seal structures which can be easily and conveniently molded as integral parts of closures utilizing relatively simple dies. A further objective of the invention is to provide seal structures as described which can be satisfactorily formed without significant difficulty from normally used, commercial grades of polymer material such as polyethylene utilizing what may be regarded as essentially "normal" injection molding procedures. A further objective of the invention is to provide seal structures as described which may be effectively utilized with container necks varying in shape from a normal or desired shape in an amount seemingly customary in the container industry.

In accordance with this invention these and various related objectives of it are achieved by providing in an integrally formed closure manufactured out of polyethylene or a similar material so as to have a closure top and a peripheral skirt extending from the bottom of said top the improvement which comprises a sealing structure comprising an annular sealing flange having a top, a generally V-shaped, pointed bottom and sides. This seal structure is joined to the top within the skirt so as to be concentric with the skirt generally along its outermost side closest to the skirt so that it will tend to flex inwardly during use.

BRIEF DESCRIPTION OF THE DRAWING

A summary of this type is inherently incapable of expressing many important facets and features of a specific structure. Further details relative to the invention will be apparent from a detailed consideration of the remainder of this specification, the appended claims and the accompanying drawing in which:

FIG. 1 is a cross-sectional view showing half of a container closure utilizing a presently preferred embodiment or form of a seal structure in accordance with this invention; and FIG. 2 is a cross-sectional view similar to FIG. 1 showing this seal structure in use on a particular container neck, only half of the neck being shown in this figure and this half being shown in cross-section.

It will be realized that the accompanying drawing is primarily intended for explanatory purposes and does not show an exact engineering drawing of a seal structure in accordance with this invention. Exact dimensions for specific seal structures utilizing the essential concepts of the invention as set forth in the dependent claims as may be required for specific applications may be easily developed through the use of routine engineering skill on the basis of the disclosure embodied in this specification.

DETAILED DESCRIPTION OF THE PREFERRED EMBODIMENT

In the drawing there is shown a closure 10 formed in an integral unit out of a resilient, flexible, self-supporting material such as polyethylene or other polymer material having similar physical properties. This closure 10 includes a top 12 and an integral peripheral skirt 14. This top 12 may contain various desired structures (not shown) relating to the use of the closure 10 such as various elements of a known or existing dispensing closure. This skirt 14 includes conventional internal threads 16 or other conventional attaching means which are adapted to mate with corresponding threads 18 or attaching means on a conventional bottle or container neck 20 when the closure 10 is used. Such a neck 20 has a generally planar end 22 which is adapted to be located within the interior of the skirt 14 beneath the bottom 24 of the top 12.

The invention described in this specification pertains to the sealing flange or ring 26 which is attached to this bottom 24 so as to form an integral part of the closure 10 as this closure is manufactured. This sealing ring 26 has a shape of an annular flange located within the skirt 14 so as to be concentric with this skirt 14. This ring 26 is positioned relatively close to the skirt 14 so that it will always fit against an end 22 even if the wall thickness of the neck 20 should for one reason or another be undesirably thin.

This ring 26 has a downwardly directed, generally V-shaped bottom 28 as shown which is adapted to fit against this end 22 of the neck 20 as the closure 10 is secured to the neck 20 in the established manner. As this occurs the bottom 28 will tend to flex slightly so as to accommodate surface roughness in the end 22 and so as to accommodate any irregularities in this end 22. Also the bottom 28 will tend to flex slightly so as to tend to accommodate any irregularity in the plane of the end 22 in case for one reason or another, this end 22 is not in a plane which is perpendicular to the axis of the neck 20.

The nature of this flexure is quite important with the present invention. With the structure shown, the upper portion of the outer side 30 of the sealing ring 26 is in effect formed integrally with the top 12 so as to constitute a portion of this top 12 whereas the inner side 32 of the ring 26 is entirely unattached and unsupported and, indeed, is separated from the top 12 by a recess 34 extending the length of the ring 26. With this method of attachment the ring 26 is in effect attached adjacent to its top 36 along its outermost side 30 adjacent to the skirt 14 so that it is free to bend or flex inwardly as the closure 10 is torqued or twisted down upon the neck 20.

This mode of construction is designed so that any tendency towards flexure caused by contact of the sealing ring 26 with the neck 20 will cause the bottom 28 to move generally inwardly towards the center of the skirt 14. This avoids the possibility of part of the sealing ring 26 or the bottom 28 flexing outwardly and part of it flexing inwardly. If such flexure should appear there is danger that the sealing ring 26 might not be significantly operative for its intended purpose because of the manner in which the sealing ring 26 would be stretched or deformed or would tend to crease. With the structure described the sealing ring 26 is sufficiently rigid so that the bottom 28 does not flex like the edge of a flexible windshield wiper blade, but instead flexes as a unit or "pillar" with the principal flexure occuring in the sealing ring 26 between the top 36 and the bottom 28 by a sort of an internal twisting action.

As a consequence of this, the entire sealing ring 26 bears down as a unit against an end 22 so that a line edge 38 on the bottom 28 is not significantly distorted, stretched or creased, but remains a "sharp" edge to engage the end 22 in such a way that a satisfactory seal is formed even if the end 22 should be unappropriately or undesirably shaped. The edge 38 is not so sharp that it will "bite" into the end 22 without sliding along the end 22 as the closure 10 is being placed upon the neck 20.

It is presently considered that satisfactory results can be achieved when the angle of the sides of the bottom 28 at the edge 38 are within the range of from about 20° to 40° and preferably within the range of from about 25° to 35°. It will be recognized that the changes in the results achieved with the invention do not dramatically and sharply vary in variation from within these ranges. These ranges are intended to be utilized as guidelines in enabling others to design sealing rings corresponding to the sealing ring 26 which will flex inwardly in an internal manner instead of along their lowermost dimensions.

The sealing structure herein described is a comparatively simple structure which can be easily and conveniently molded with relatively simple dies or molds with a minimum of difficulty. These are all important factors from a manufacturing standpoint. From both a manufacturing and use standpoint it is also important that this structure may be easily and conveniently used in the creation of effective seals which can be satisfactorily utilized with many containers in sealing many different types of fluids against leakage.

I claim:

1. In a closure having a closure top and a peripheral skirt extending from the bottom of said top, said skirt including means for attaching said skirt to a container neck in a position in which said top extends across said neck, said closure including a seal structure which is integral with said top located within said skirt and beneath said top for forming a seal with respect to said neck, the improvement which comprises:

said seal structure comprising an annular sealing flange having a top, a bottom and concentric sides, said sealing flange being spaced from the interior of said skirt and being formed of a resilient, flexible, self-supporting material, capable of engaging a container neck so as to form a seal therewith, said flange extending generally parallel to the interior of the skirt, the lower end of said flange remote from said top having a V-shaped bottom, having a lower, downwardly directed edge having separate sides located at an angle with respect to one another of from about 20° to 40°, said flange being attached to said top along the side thereof and beneath the top of said flange remote from the center of said skirt and adjacent to the top of said flange, the innermost side of said flange being separated from a remainder of said closure by a recess, extending the length of said flange and above said flange and being entirely unattached and unsupported, said flange being sufficiently flexible between its top and bottom so as to be capable of deforming to form a seal with a top of said container neck if such a top should have a surface irregularity or should not be flat in a place perpendicular to the axis of said skirt, said flange being mounted so that it will tend to flex inwardly in adjusting to the configuration and location of said container neck relative to the said skirt and said top in forming a seal with said neck, said flange being the only sealing means on said closure top intended to contact the top of said container neck, said cap having an inner surface which extends upward from said flange in vertical alignment with said downwardly directed edge.

* * * * *